(12) United States Patent
He

(10) Patent No.: US 7,109,889 B2
(45) Date of Patent: Sep. 19, 2006

(54) METHODS AND APPARATUS FOR SURFACE MOVEMENT SITUATION AWARENESS

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 108 days.

(21) Appl. No.: 10/790,512

(22) Filed: Mar. 1, 2004

(65) Prior Publication Data

US 2005/0190079 A1 Sep. 1, 2005

(51) Int. Cl.
*G01C 21/00* (2006.01)
*G01C 23/00* (2006.01)

(52) U.S. Cl. .................... 340/971; 340/972
(58) Field of Classification Search .......... 340/971, 340/972, 945, 958, 995.26, 961, 995.15
See application file for complete search history.

(56) References Cited

U.S. PATENT DOCUMENTS

| | | | |
|---|---|---|---|
| 5,025,382 A * | 6/1991 | Artz ........................... | 701/120 |
| 5,227,786 A | 7/1993 | Hancock | |
| 5,317,321 A | 5/1994 | Sass | |
| 5,334,982 A | 8/1994 | Owen | |
| 5,530,440 A | 6/1996 | Danzer et al. | |
| 5,819,199 A * | 10/1998 | Kawai et al. ............... | 701/200 |
| 6,161,097 A | 12/2000 | Glass et al. | |
| 6,182,005 B1 | 1/2001 | Pilley et al. | |
| 6,195,609 B1 | 2/2001 | Pilley et al. | |
| 6,246,342 B1 * | 6/2001 | Vandevoorde et al. ...... | 340/961 |
| 6,278,965 B1 | 8/2001 | Glass et al. | |
| 6,314,363 B1 | 11/2001 | Pilley et al. | |
| 6,396,535 B1 | 5/2002 | Waters | |
| 6,571,166 B1 | 5/2003 | Johnson et al. | |
| 6,614,397 B1 * | 9/2003 | Pullen et al. ............... | 342/456 |
| 6,725,154 B1 * | 4/2004 | Kamikawa et al. ......... | 701/208 |
| 6,862,519 B1 * | 3/2005 | Walter ........................ | 701/120 |
| 2002/0102987 A1 | 8/2002 | Walter | |
| 2003/0009278 A1 | 1/2003 | Mallet et al. | |
| 2003/0083804 A1 | 5/2003 | Pilley et al. | |
| 2003/0105579 A1 | 6/2003 | Walter | |
| 2003/0105581 A1 | 6/2003 | Walter | |
| 2004/0006412 A1 | 1/2004 | Doose et al. | |

FOREIGN PATENT DOCUMENTS

WO    WO 03/098576 A1    11/2003

OTHER PUBLICATIONS

International Search Report dated Jun. 16, 2005, Application No. PCT/US 03/2005/006611, 12 pages..
Jones and Young, "Airport Surface Movement Technologies-Atlanta Demonstration Overview," ISBN 0-7803-5086-3, 1998 IEEE.

* cited by examiner

*Primary Examiner*—John Tweel, Jr.
(74) *Attorney, Agent, or Firm*—Dina Khaled, Esq.; Armstrong Teasdale LLP

(57) ABSTRACT

A method for enhancing ground situational awareness to an aircraft operating at an airport is described. The method includes displaying, within the aircraft, runways and taxiways for the airport and displaying a position of the aircraft with respect to the runways and taxiway. A resolution of at least one of a runway, a taxiway, and an aircraft position is based on at least one of a selected resolution, a position and heading of the aircraft, a taxi speed, and a ground speed of the aircraft.

37 Claims, 11 Drawing Sheets

METHODS AND APPARATUS FOR SURFACE MOVEMENT SITUATION AWARENESS

BACKGROUND OF THE INVENTION

This invention relates generally to ground operations of aircraft, and more specifically, to methods and apparatus for surface movement situation awareness for aircraft on runways and taxiways.

With regard to the safety of aircraft utilizing runways and taxiways at an airport, incursions of such spaces by other aircraft and/or airport support vehicles is a significant safety issue. For example, the darkness of night, weather, and other lower visibility conditions may lead to mistakes by pilots and cause accidents. To further complicate the problems, business aviation pilots and other private aircraft often do not operate within fixed routes, and therefore often operate in unfamiliar airports.

Also, flight crews are susceptible to losing an overall awareness of runway and taxiway positions of their own aircraft when operating in unfamiliar airports. Incidents of aircraft taxiing to closed runways and colliding with construction equipment have been documented. Other problems include near misses and collisions between moving aircraft, taxiing to and taking off from runways not assigned by a flight traffic controller, intrusions onto active runways, and moving onto taxiways without proper clearance from an airport control tower.

Airport maps with detailed runway and taxiway displays are considered very useful by pilots when preparing for a landing and subsequent taxiing at an airport. Such displays provide pilots with a visual aid when approaching a runway or taxiway. However, a typical ground operation map for an airport generally consists of a large numbers of taxiways, text labels, lines, and ground areas designated for different purposes. Such maps sometimes also include structural outlines for the buildings associated with the airports. The effectiveness of such displays are sometimes significantly reduced due to clutter on the screen of the display. Such displays further do not effectively account for a position of the aircraft on the ground with respect to the displayed runways and taxiways.

Audio based solutions, for example, enhanced ground proximity warning systems (EGPWS), provide a certain amount of situational awareness for ground based aircraft operation with audio signals. However, such an approach may be compromised due to communications between pilot and air traffic control and other unexpected audio signals.

BRIEF SUMMARY OF THE INVENTION

In one aspect, a method for enhancing runway and taxiway awareness to an aircraft is provided. The method comprises displaying, within the aircraft, runways and taxiways for the airport and displaying a position of the aircraft with respect to the runways and taxiways. A resolution of at least one of a runway, a taxiway, and an aircraft position is based on at least one of a selected resolution, a position and heading of the aircraft, a taxi speed, and a ground speed of the aircraft.

In another aspect, a ground situational awareness system for an aircraft is provided. The system comprises a graphics generation computer, a database of runway and taxiway map information for a number of airports, and a display for displaying runway maps, taxiways maps, and a position of the aircraft with respect to the runways and taxiways. The computer is communicatively coupled to the display and receives position and heading for the aircraft from an external source. The computer is further configured to access the database to retrieve runway and taxiway map information and configure the map information and the position and heading for the aircraft for displaying an aircraft position with respect to the runway and taxiways on the display.

In still another aspect, a unit programmed to provide ground situational awareness for an aircraft is provided. The unit is configured to access a database of runway and taxiway map information for an airport and receive position and heading for the aircraft from an external source. The unit is further configured to generate data which causes a display of runway maps, taxiways maps, and a position of the aircraft with respect to the runways and taxiways to be displayed on an external display.

DETAILED DESCRIPTION OF THE INVENTION

The below described methods and apparatus address the above described runway and taxiway situational awareness problems. Specifically, a number of display methods for enhancing a flight crew's awareness of current aircraft location with respect to a map of airport runway and taxiway locations are provided. Awareness of expected intersections for taxi operations are also provided.

Figure 1:
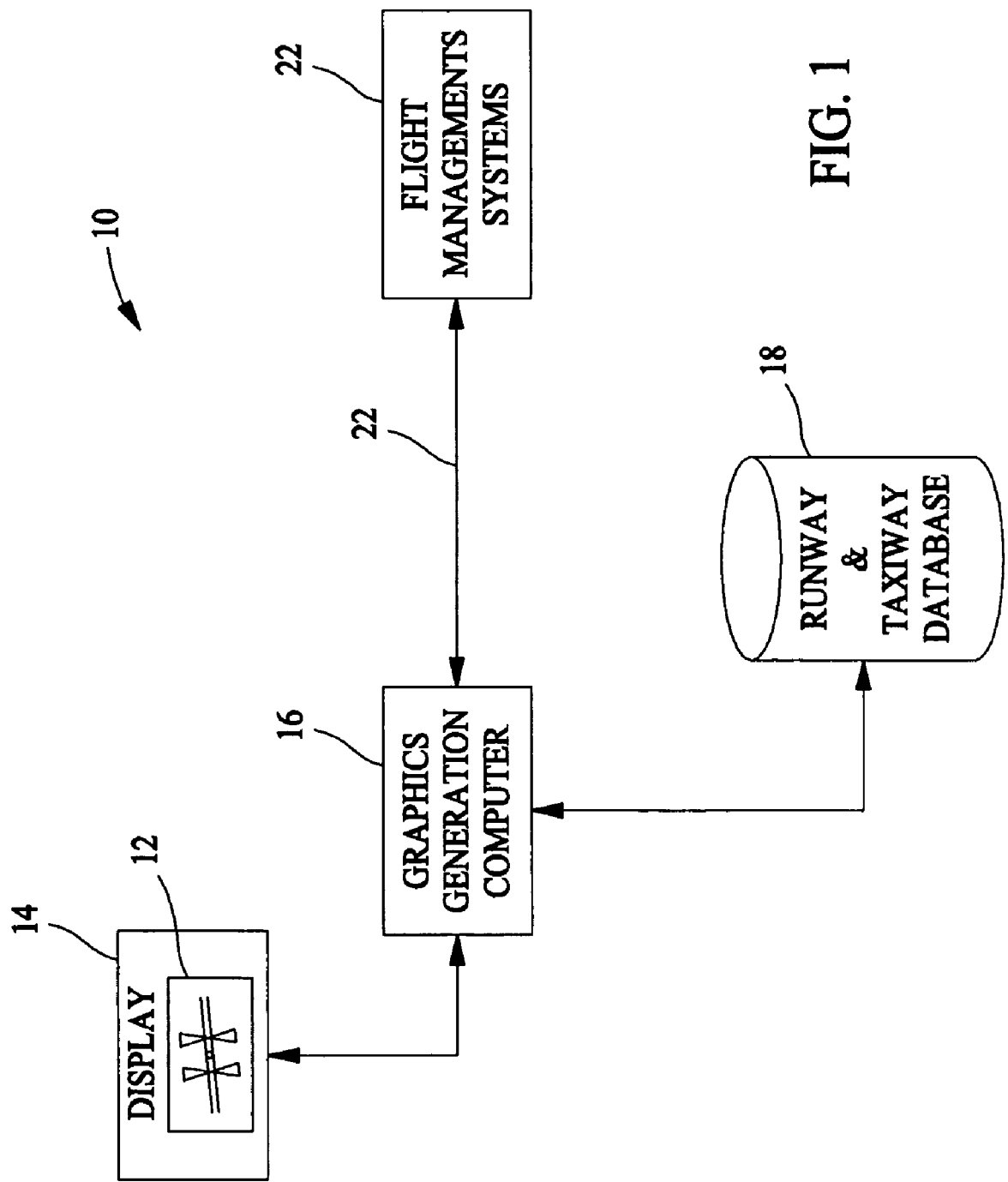
FIG. 1 is a block diagram of a display system for an aircraft.

Referring to FIG. 1, a display system 10 for an aircraft is illustrated. Display system 10 includes graphic maps 12 displayed on a display 14, for example, an avionics multi-functional flat-panel display. Display system 10 further includes a graphics generation computer 16, a database 18 of airport runway and taxiway, information, and an interface 20 to, for example, a flight management system 22. In one embodiment, flight management system 22 provides graphics generation computer 16 a current status for the aircraft (not shown) including, but not limited to, position and heading. In a preferred embodiment, graphics generation computer 16 includes various algorithms implemented in software, which, based at least partially on user selections from display 14, determines what runway and taxiway features will be displayed on display 14. A resolution of the displayed runway and taxiway features may also be user selected. In other embodiments, runway and taxiway features and a resolution of those features displayed on display 14 are at least partially based on current conditions (i.e., taxi speed, aircraft position with respect to a runway) related to the aircraft.

FIGS. 2–11 illustrate various runway and taxiway features in a graphic map format that is displayed on, for example, display 14 (shown in FIG. 1). The displays include map displays of all the airport runways and taxiways, and displays which highlight and bring to flight crew attention the runway they are about to take-off from or land on based on current aircraft location and heading. Also displayed is a taxi awareness feature. When the taxi awareness feature is active, highlighted indications of taxiway intersections ahead are provided. The taxi awareness feature is at least partially based a distance to the intersection and a taxi speed of the aircraft. In one embodiment, the display decisions are based on the current location, heading, and taxi speed for predicting a next position of the aircraft within a decision time frame. The methods which are embodied within the on screen displays enhance flight crew awareness of the current location for their aircraft and help to determine if ground taxi operations are proceeding according to the clearance provided from a control tower.

As below described, system 10 and FIGS. 2–11 illustrate a method for providing ground situational awareness to an aircraft operating at an airport. The method includes providing a display, within the aircraft, of the runways and taxiways for the airport, determining a resolution for the display based on at least one of a resolution selected by a flight crew member, a position and heading of the aircraft, and a taxi speed of the aircraft, and displaying a position of the aircraft on the display with respect to the runways and taxiways.

Figure 2:
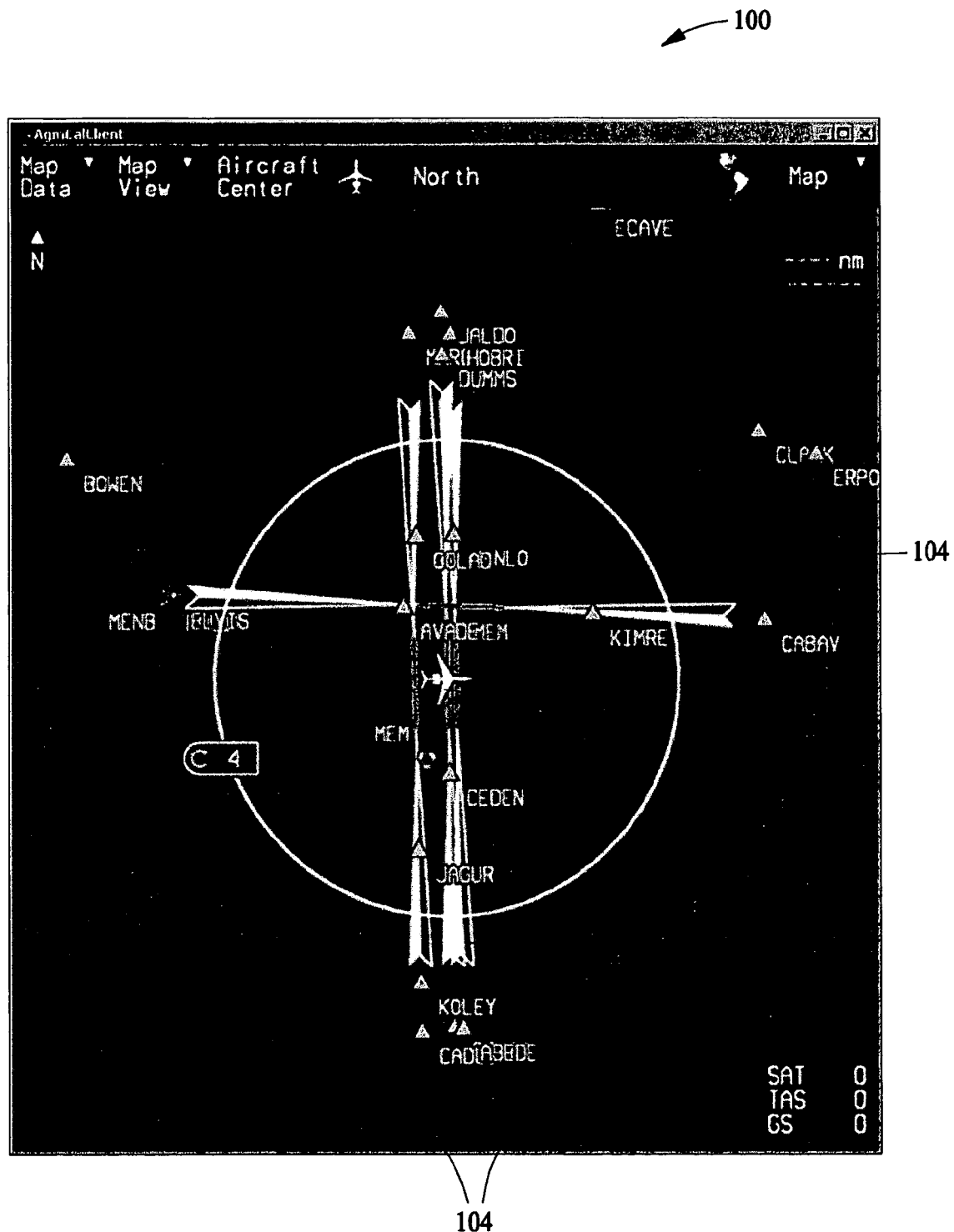
FIG. 2 is a sample avionics display illustrating a position of an aircraft with respect to runways and taxiways of an airport.

FIG. 2 is an illustration of a sample avionics display 100 which illustrates a position of an aircraft 102 with respect to runways 104 of an airport. As shown on display 100, the resolution for display 100 is such that only runways 104 are illustrated. Due to the selected resolution for display 100, taxiways for the airport are not shown on display 100. Pull down menus labeled "Map Data" and "Map View" allow a crew member to select different display formats, including a resolution for display 100. While shown on display 100 as pull down menus, it is known that certain avionics multi-function displays incorporate a number of switches and buttons around a perimeter of the display which allow a user to make pre-programmed selections. It is contemplated that in certain embodiments such switches and buttons are programmed to allow for selection of display resolution.

Figure 3:
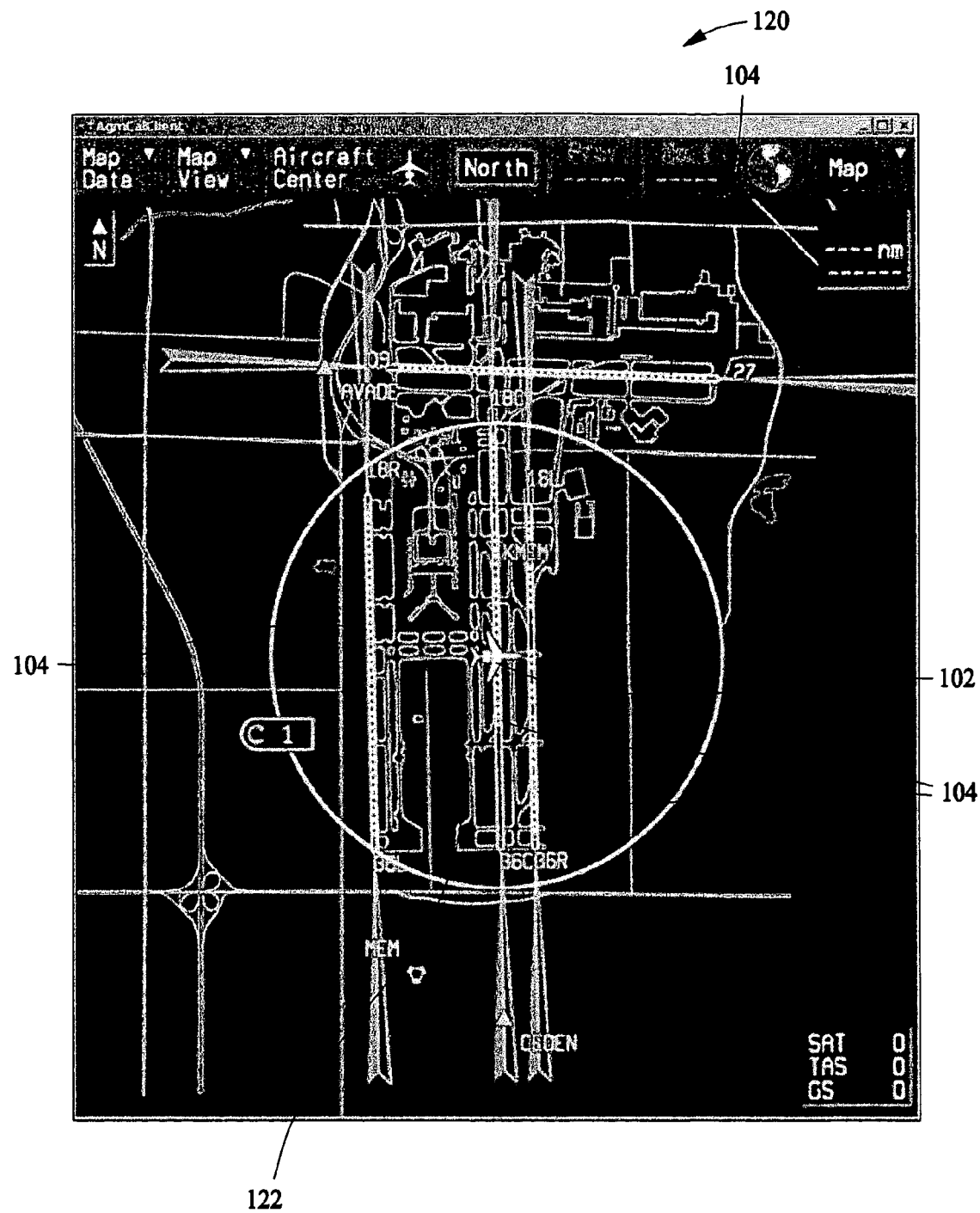
FIG. 3 illustrates a position of an aircraft with respect to runways and taxiways of an airport at a closer range than in FIG. 2.

FIG. 3 is an illustration of a sample avionics display 120 which shows a position of aircraft 102 with respect to runways 104 and taxiways 122 of an airport at a higher resolution than in FIG. 2. While still not at a high resolution, display 120 provides enough resolution to allow a flight crew to determine an approximate location of aircraft 102 with respect to runways 104 and taxiways 122. While taxiways 122 are shown on display 120, a position of aircraft 102 with respect to taxiways 122 cannot easily be discerned.

Figure 4:
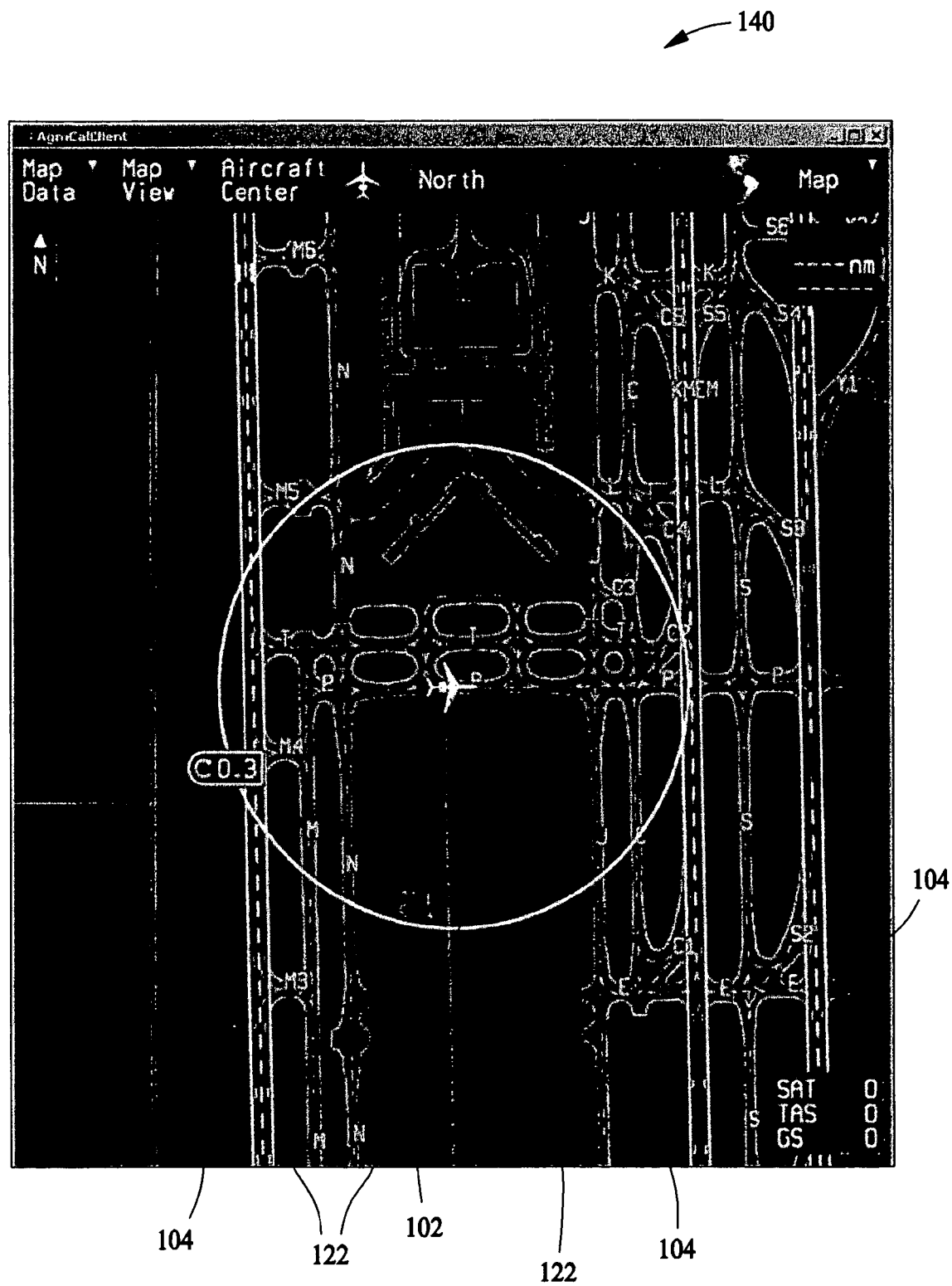
FIG. 4 illustrates a position of an aircraft with respect to runways and taxiways of an airport at a closer range than in FIG. 3.

FIG. 4 is an illustration of a sample avionics display 140 which shows a position of aircraft 102 with respect to runways 104 and taxiways 122 of an airport at a higher resolution than in FIG. 3. With the selected resolution of display 140, entrances to and exits and from runways 104 and taxiways 122 can be discerned. Display 140 includes increased details for taxiways 122, which reduces information clutter that is presented on display 140 from the airport fixtures and buildings that are in proximity to taxiways 122.

Figure 5:
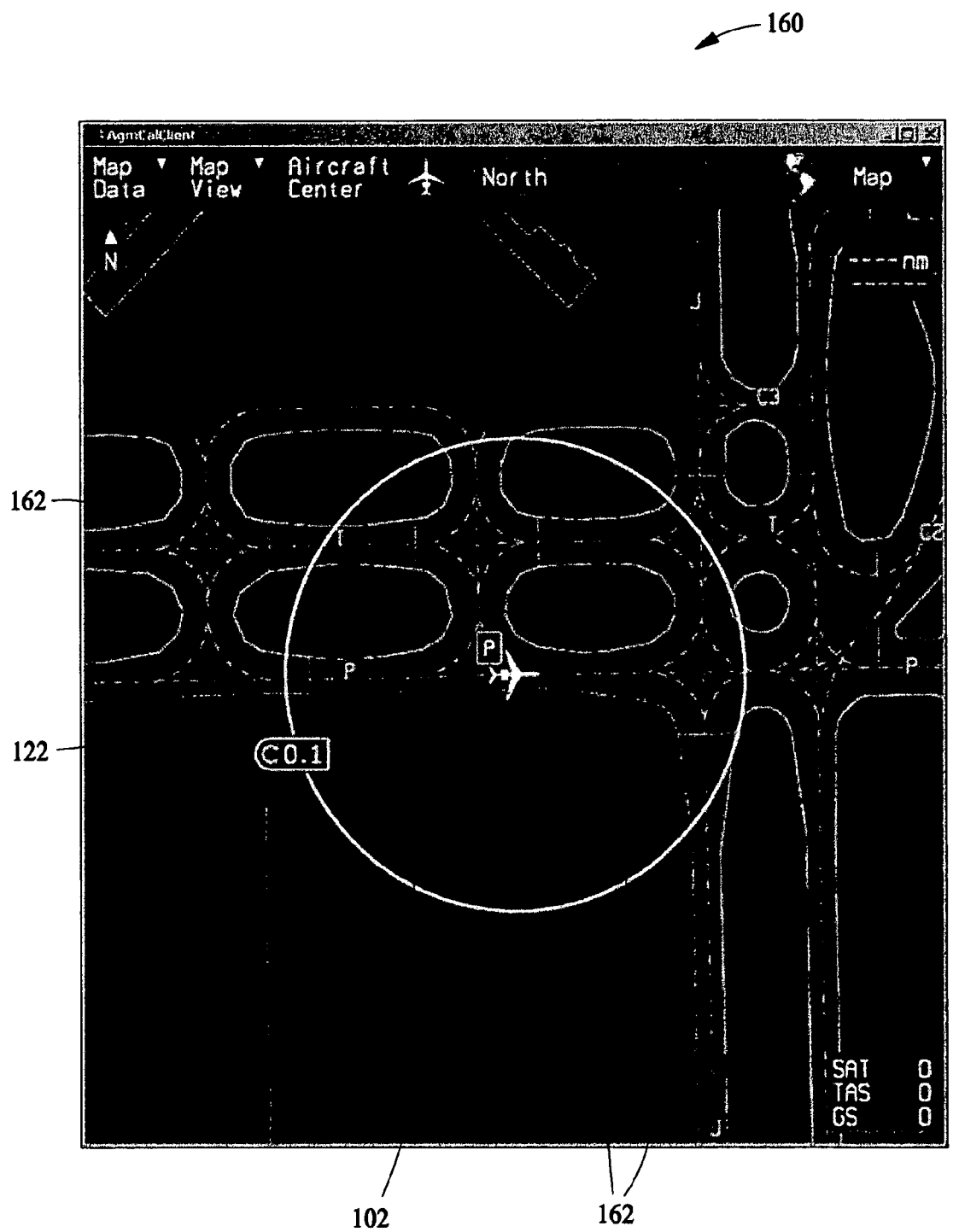
FIG. 5 illustrates a position of an aircraft on a taxiway at a closer range than in FIG. 4.

FIG. 5 is an illustration of a sample avionics display 160 which shows a position of aircraft 102 with respect to runways 104 and taxiways 122 of an airport at a higher resolution than in FIG. 4. With the resolution of display 160, a flight crew is able to determine whether aircraft 102 is aligned with centerlines 162 of taxiways 122. In addition, resolution of display 160 is such that taxiway identifiers are shown.

Figure 6:
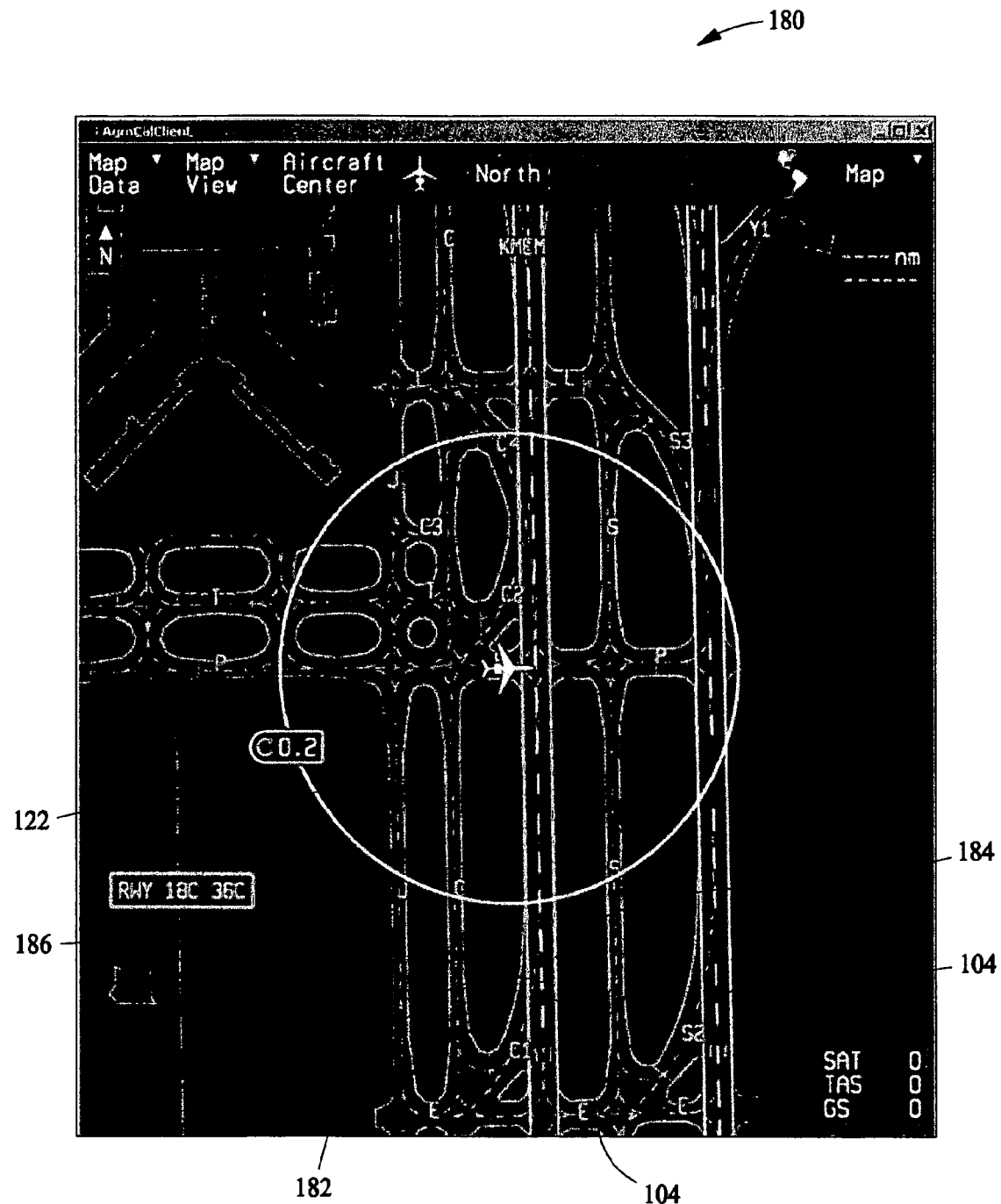
FIG. 6 is a sample avionics display illustrating a position of an aircraft on a taxiway and within a threshold distance to a runway, with the runway highlighted and runway identifiers displayed.
Figure 7:
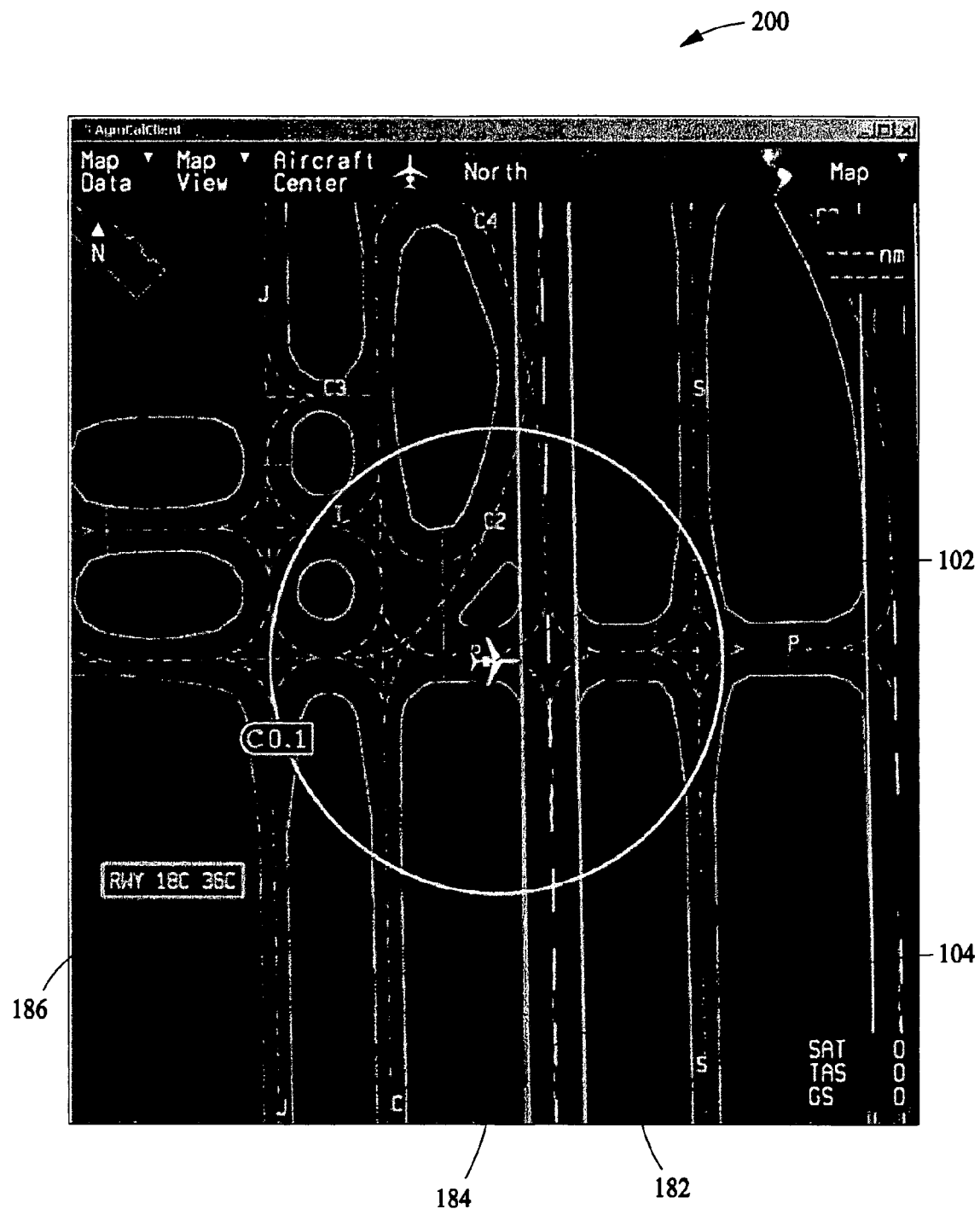
FIG. 7 illustrates the position of the aircraft of FIG. 6 at a closer range.

FIGS. 6 and 7 are sample avionics displays, 180 and 200 respectively, illustrating situational awareness for aircraft 102 as aircraft 102 approaches a runway. Referring to FIG. 6, sample avionics display 180 illustrates a position of aircraft 102 on taxiway 122 as it approaches runway 104. In one embodiment, display 180 is presented to a flight crew of aircraft 102 when aircraft 102 is within a threshold distance to a centerline 182 of runway 104. When aircraft 102 is approaching the threshold distance, the runway is highlighted, for example, with a different color border 184 in comparison to other runways in the display. Runway identifiers 186 are also shown. In a specific embodiment, a minimum threshold distance which causes system 10 (shown in FIG. 1) to display avionics display 180 is a length of aircraft 102 added to a half width of runway 102. In another embodiment, the minimum threshold distance for display of avionics display 180 increases as a function of increasing taxi speed of aircraft 102 towards runway 104.

FIG. 7 illustrates a sample avionics display 200 where the position of aircraft 102 with respect to runway 104 is displayed at a higher resolution than illustrated in FIG. 6. In one embodiment, the resolution is selectable by a flight crew member of aircraft 102. In another embodiment, the resolution is selected by system 10 (shown in FIG. 1) as a function of threshold distance, as described above, taxi speed, or aircraft ground speed.

Figure 8:
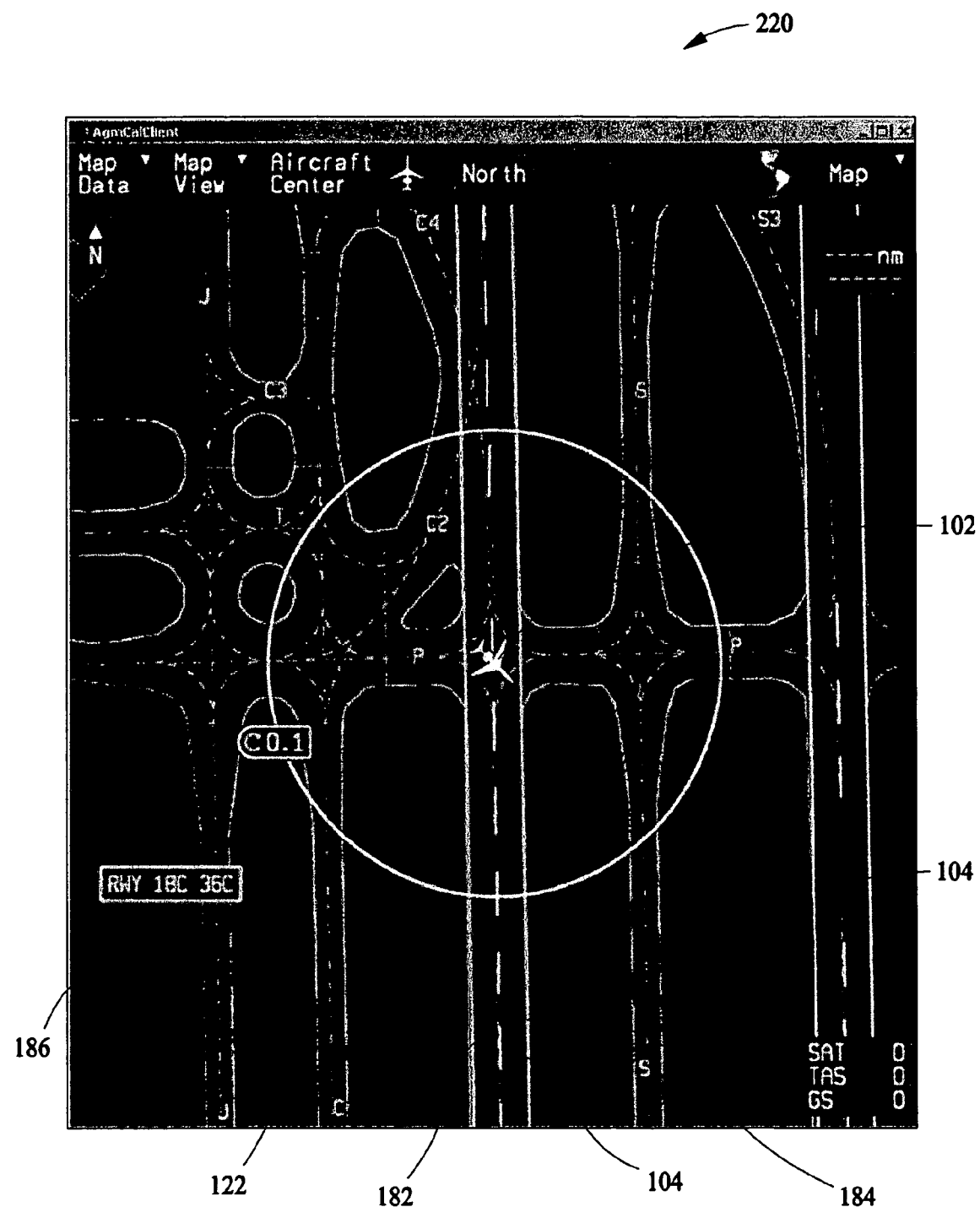
FIG. 8 is a sample avionics display illustrating an aircraft entering a highlighted runway.
Figure 9:
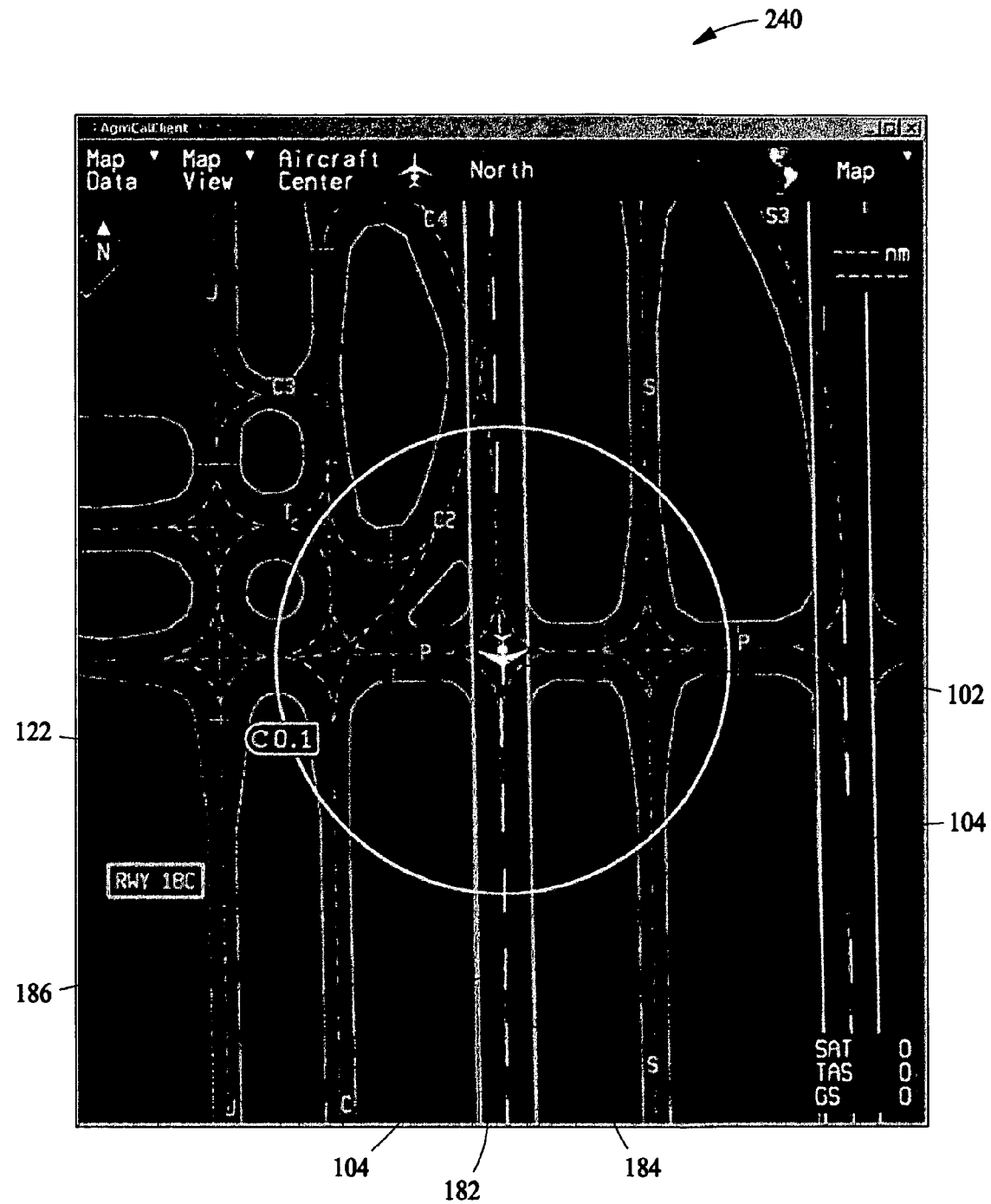
FIG. 9 is a sample avionics display illustrating an aircraft on a runway which is properly aligned with the highlighted runway.

FIGS. 8 and 9 are sample avionics displays, 220 and 240 respectively, illustrating situational awareness for aircraft 102 as aircraft 102 is on runway 104. Sample avionics display 220 illustrates a runway awareness, and is displayed by system 10 (shown in FIG. 1), when a center of aircraft 102 from a centerline 182 of runway 104 is less than a threshold value. Sample avionics display 240 is displayed by system 10 when a heading of aircraft 102 is substantially aligned with a direction of runway 104. Avionics displays 220 and 240 are utilized by a flight crew to facilitate getting onto and getting off of runway 104 with a proper clearance from a control tower.

Figure 10:
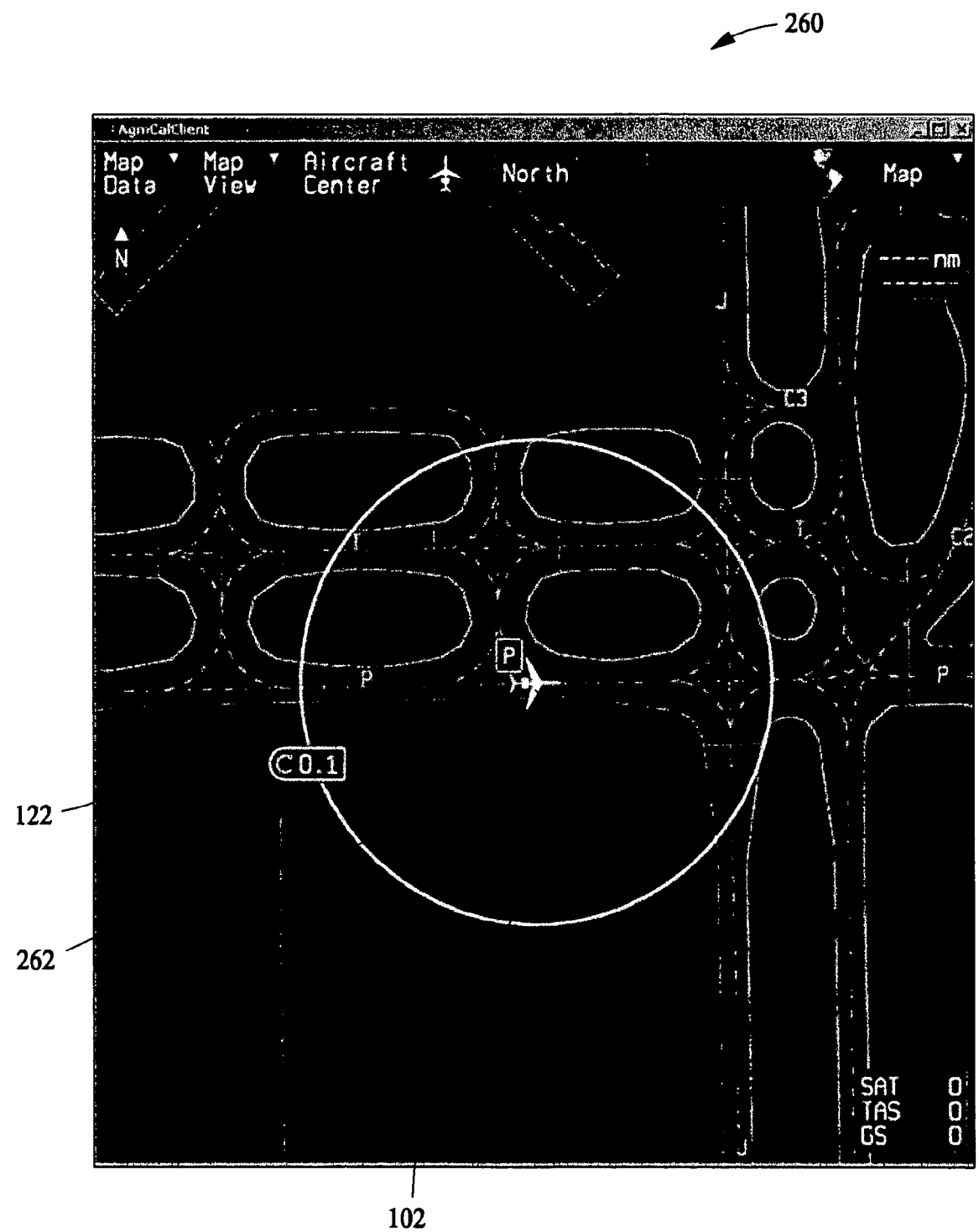
FIG. 10 is a sample avionics display illustrating an aircraft taxiing on a taxiway.
Figure 11:
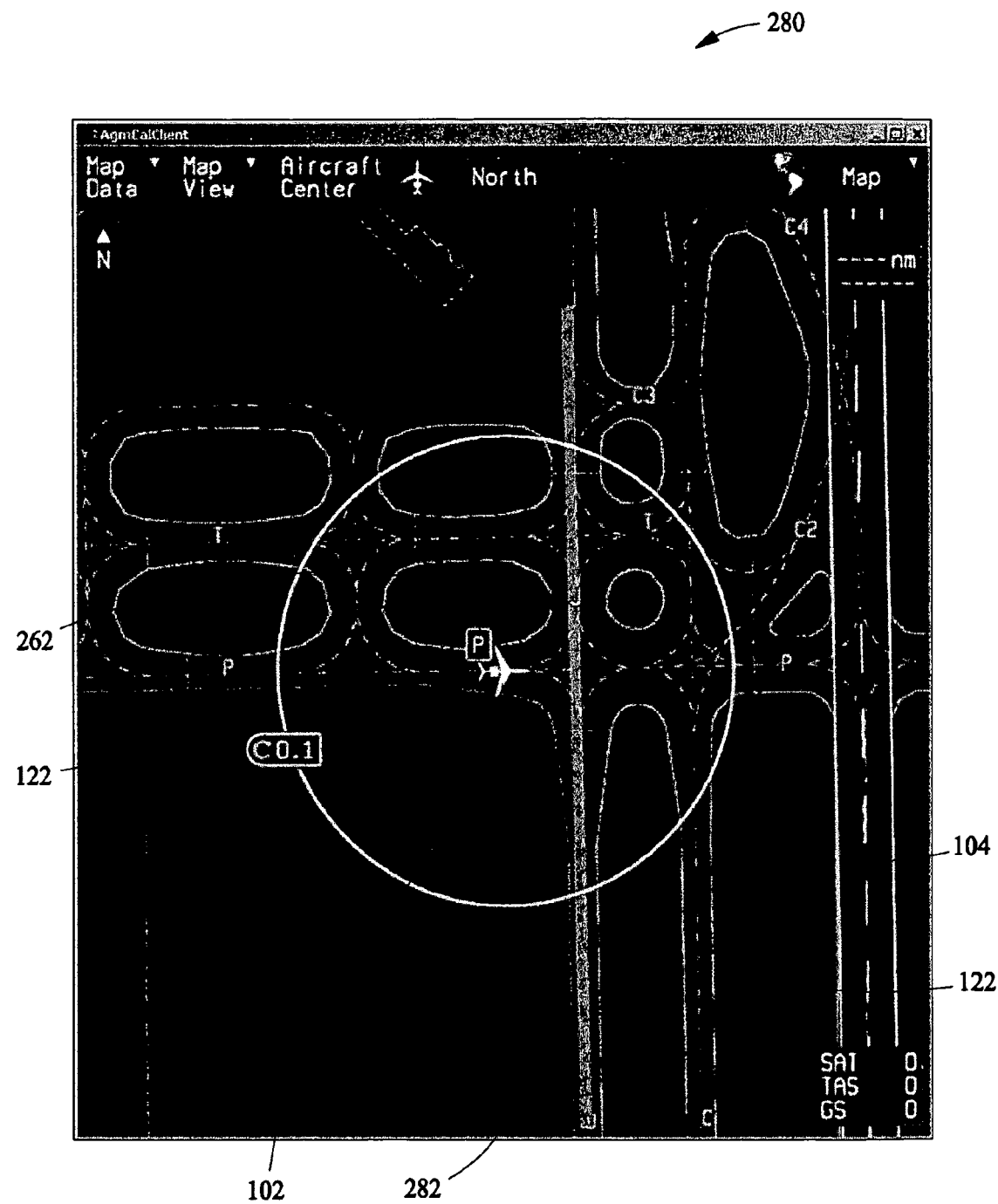
FIG. 11 is a sample avionics display illustrating an aircraft approaching a taxiway intersection.

FIGS. 10 and 11 are sample avionics displays, 260 and 280 respectively, illustrating a taxiway awareness feature for aircraft 102 as aircraft 102 taxis on a taxiway 122. When aircraft 102 is not approaching a runway 104 (not shown in FIG. 10), a taxiway label 262 travels along with aircraft 102 on display 260. Display 260 therefore provides an awareness of which taxiway 122 aircraft 102 is on, compared to the taxiway provided by, for example, an air traffic controller. As illustrated by display 280, as aircraft 102 approaches an intersecting taxiway 282, intersecting taxiway 282 is highlighted when an intersecting distance between aircraft 102 and intersecting taxiway 282 is less than a preset value. In one embodiment, the preset value increases as the taxi speed of aircraft 102 increases.

The above described methods and apparatus describe displaying a ground situational awareness based on runway and taxiway map information stored in a database related to a current position and heading of an aircraft. The above described methods are configurable to receive aircraft position and heading from any number of sources, including, but not limited to, global positioning satellites, inertial navigation systems, magnetic compasses, attitude heading reference systems and gyroscopes.

The above described methods and apparatus provide an improved overall position awareness and situation awareness for aircraft over known solutions. In addition, embodiments of the above described methods and apparatus allow a pilot or other flight crew member to view a desired runway or taxiway path and surrounding area with a variable scale and a varying amount of detail. Such embodiments provide flexibility regarding display symbology, text, and color selections, and enable users to rapidly discern needed position and situation information. The information is easily understood and therefore compatible with high work load conditions, due to the format of the displays.

Further, the above described methods and apparatus are readily incorporated into known systems, including, but not limited to, interactive navigation lateral maps and other advanced multi-function displays and navigation displays. The above described solutions for the problems of runway and taxiway situational awareness complement enhanced ground proximity warning systems, which provide an audio based situational awareness, with a visual environment.

While the invention has been described in terms of various specific embodiments, those skilled in the art will recognize that the invention can be practiced with modification within the spirit and scope of the claims.

What is claimed is:

1. A method for enhancing ground situational awareness to an aircraft operating at an airport, said method comprising:
   displaying, within the aircraft, runways and taxiways for the airport; and
   displaying a position of the aircraft with respect to the runways and taxiways, a resolution of at least one of a runway, a taxiway, and an aircraft position based on at least one of a selected resolution, a position and heading of the aircraft, a taxi speed, and a ground speed of the aircraft.

2. A method according to claim 1 wherein displaying the runways and taxiways comprises accessing a database of airport runways and taxiways.

3. A method according to claim 1 wherein displaying the runways and taxiways comprises displaying the runways and taxiways in a graphical map form.

4. A method according to claim 1 wherein displaying the runways and taxiways comprises displaying runways in a first color and taxiways in a second color that is different than the first color.

5. A method according to claim 1 wherein the resolution is based upon a threshold distance between the aircraft and a centerline of a runway.

6. A method according to claim 5 wherein a minimum threshold distance between the aircraft and a centerline of the runway is a length of the aircraft added to a half width of the runway.

7. A method according to claim 5 wherein the threshold distance is adjusted according to a taxi speed of the aircraft towards the runway.

8. A method according to claim 1 wherein the resolution is based on a taxiway awareness feature which, when the aircraft is heading towards an intersecting taxiway, provides a highlighted indication of the intersecting taxiway when an intersecting distance between the aircraft and the intersecting taxiway is less than a preset value.

9. A method according to claim 8 wherein the preset value is adjusted according to a taxi speed of the aircraft towards the intersecting taxiway.

10. A method according to claim 1 further comprising displaying a taxiway label which travels along with a position of the aircraft on the display.

11. A method according to claim 1 further comprising displaying a runway label and color-highlighted runway outline on the display when a position of the aircraft is within a threshold distance from the runway.

12. A method according to claim 1 wherein the resolution is based on predicting a next position of the aircraft within a decision time frame.

13. A method according to claim 1 further comprising determining if ground taxi operations for the aircraft are proceeding according to a provided clearance.

14. A method according to claim 1 further comprising obtaining a position and heading for the aircraft from a flight management system.

15. A method according to claim 1 further comprising highlighting a runway the aircraft is about to land on or take off from based on a current position and heading of the aircraft.

16. A method according to claim 1 wherein the resolution is based on providing a runway awareness display when a distance between a center of the aircraft and a runway centerline is less than a threshold value.

17. A method according to claim 1 wherein determining a resolution for the display comprises providing a runway awareness display when a heading of the aircraft is substantially aligned with a runway direction.

18. A ground situational awareness system for an aircraft, said system comprising:
   a database of runway and taxiway map information for a number of airports;
   a display for displaying runway maps, taxiways maps, and a position of the aircraft with respect to the runways and taxiways, said display comprising a resolution selection capability; and
   a graphics generation computer communicatively coupled to said display, said display configured to communicate a selected resolution to said graphics generation computer, said computer configured to receive a position and a heading for the aircraft from an external source, said computer programmed to access said database to retrieve runway and taxiway map information, said computer configuring the runway and taxiway map information and the position and heading for the aircraft for displaying an aircraft position with respect to the runway and taxiways on said display according to the selected resolution.

19. A situational awareness system according to claim 18 wherein said graphics generation computer comprises an input for receiving a taxi speed for the aircraft, said computer selecting a resolution for the display of the aircraft and map information on said display based on the taxi speed.

20. A situational awareness system according to claim 18 wherein said system is configured to display the runways and taxiways for an airport in a graphical map form.

21. A situational awareness system according to claim 18 wherein said display is configured to display map information for runways using a first color and display map information for taxiways using a second color, the second color being different from the first color.

22. A situational awareness system according to claim 18 wherein a resolution for the map information and the aircraft is based upon a threshold distance between the aircraft and a centerline of a runway.

23. A situational awareness system according to claim 22 wherein said system adjusts the threshold distance according to a taxi speed of the aircraft toward the runway.

24. A situational awareness system according to claim 18 wherein said system comprises a taxi awareness feature which, when the aircraft is heading towards an intersecting taxiway, causes said display to provide a highlighted indication of the intersecting taxiway when an intersecting distance between the aircraft and the intersecting taxiway is less than a preset value.

25. A situational awareness system according to claim 24 wherein the preset value is adjusted according to a taxi speed of the aircraft towards the intersecting taxiway.

26. A situational awareness system according to claim 18 wherein said system is configured to display a taxiway label which travels along with a position of the aircraft on said display.

27. A situational awareness system according to claim 18 wherein said system is configured to display a runway label on the display when a position of the aircraft is within a threshold distance from that runway.

28. A situational awareness system according to claim 18 wherein said system is configured to predict and display a next position of the aircraft within a decision time frame based on the taxi speed.

29. A situational awareness system according to claim 18 wherein said system comprises an input for receiving position and heading data for the aircraft.

30. A situational awareness system according to claim 18 wherein said system is configured to highlight a display of a runway the aircraft is preparing to land on or preparing to take off from based on a current aircraft position and heading.

31. A situational awareness system according to claim 18 wherein said system is configured to display a runway awareness display on said display when a heading of the aircraft is substantially aligned with runway direction.

32. A unit programmed to provide ground situational awareness for an aircraft, said unit configured to:
  access a database of runway and taxiway map information for an airport;
  receive position and heading for the aircraft from an external source;
  receive a resolution selection; and
  generate data which causes a display of runway maps, taxiways maps, and a position of the aircraft with respect to the runways and taxiways to be displayed on an external display according to the received resolution selection.

33. A unit according to claim 32 comprising an input for receiving a taxi speed for the aircraft, said unit configured to select a resolution for the display of the aircraft and map information based on the received taxi speed.

34. A unit according to claim 32 configured to select a resolution for the display of the map information and the aircraft based upon a threshold distance between the aircraft and a centerline of a runway.

35. A unit according to claim 34 comprising an input for receiving a taxi speed for the aircraft, said unit configured to adjust the threshold distance according to a taxi speed of the aircraft toward the runway.

36. A unit according to claim 32 configured with a taxi awareness feature which, when the aircraft is heading towards an intersecting taxiway, causes a display to provide a highlighted indication of the intersecting taxiway when an intersecting distance between the aircraft and the intersecting taxiway is less than a preset value.

37. A unit according to claim 32 configured with a runway awareness feature to be displayed when the aircraft is substantially aligned with a runway direction.

* * * * *